(12) United States Patent
Chung (10) Patent No.: US 7,681,567 B2
(45) Date of Patent: Mar. 23, 2010

(54) MOBILE BARBECUE GRILL

(76) Inventor: Kiosky Chung, 8F-1, No. 497, Jhongming S. Rd., West District, Taichung City 403 (TW)

( * ) Notice: Subject to any disclaimer, the term of this patent is extended or adjusted under 35 U.S.C. 154(b) by 0 days.

(21) Appl. No.: 11/766,420

(22) Filed: Jun. 21, 2007

(65) Prior Publication Data
US 2008/0314376 A1    Dec. 25, 2008

(51) Int. Cl.
   *F24B 3/00*   (2006.01)
   *A47J 27/00*  (2006.01)
   *A47J 37/00*  (2006.01)
   *A47J 37/06*  (2006.01)

(52) U.S. Cl. .............. 126/25 R; 126/9 R; 126/9 B; 108/117; 108/118; 108/119

(58) Field of Classification Search .......... 126/25 R, 126/9 R, 9 B; 431/361; 16/86.2, 89, 90, 16/94 R; 108/117, 118, 121; 451/361
See application file for complete search history.

(56) References Cited

U.S. PATENT DOCUMENTS

| | | | | |
|---|---|---|---|---|
| 631,556 | A * | 8/1899 | Bushnell | 108/117 |
| 2,003,974 | A * | 6/1935 | Pearson | 126/25 R |
| 2,040,080 | A * | 5/1936 | Collins | 160/191 |
| 2,285,597 | A * | 6/1942 | Allen et al. | 108/120 |
| 2,419,344 | A * | 4/1947 | Eggleston | 126/25 R |
| 2,484,239 | A * | 10/1949 | Moon et al. | 126/25 R |
| 2,829,936 | A * | 4/1958 | Anderson | 108/117 |
| 2,853,348 | A * | 9/1958 | Adler | 108/160 |
| 2,871,075 | A * | 1/1959 | Stone | 108/119 |
| 2,937,399 | A * | 5/1960 | De Vore | 16/263 |
| 3,008,463 | A * | 11/1961 | Frank | 126/9 R |
| 3,039,215 | A * | 6/1962 | Boardman | 108/117 |
| 3,152,833 | A * | 10/1964 | Creveling et al. | 297/140 |
| 3,481,320 | A * | 12/1969 | Schaefer | 126/25 R |
| 3,556,076 | A * | 1/1971 | Stewart | 126/9 R |
| 4,210,118 | A * | 7/1980 | Davis et al. | 126/25 R |
| 4,296,694 | A * | 10/1981 | Kobayashi | 108/116 |
| 5,163,414 | A * | 11/1992 | Haynes, Jr. | 126/25 R |
| 5,318,322 | A * | 6/1994 | Home | 280/645 |
| 5,375,296 | A * | 12/1994 | Zaleskie | 16/237 |
| 5,606,775 | A * | 3/1997 | Dame | 16/387 |

(Continued)

*Primary Examiner*—Steven B McAllister
*Assistant Examiner*—Daniel E Namay
(74) *Attorney, Agent, or Firm*—Alan Kamrath; Kamrath & Associates PA (57) ABSTRACT

A mobile barbecue grill includes a base, a first handle, an upper lid, a holding member, a first bracing rack, a second bracing rack and a pair of wheels. The base aims to hold a cooking grid. The first handle is located on an outer side of the base. The upper lid aims to cover the base. The holding member has one end coupling with the bottom of the base. The first bracing rack is located beneath the base and has two first upright bars and a first transverse bar coupling the first upright bars. The first transverse bar is leaned against the holding member and supports the base. The first bracing rack has one end remote from the base and resting on the ground surface. The second bracing rack is located beneath the base and has two second upright bars and a second transverse bar coupling the second upright bars. The second transverse bar is pivotally coupled with the bottom of the base. The second upright bars and the first upright bars are pivotally coupled. The wheels are coupled with one end of the second upright bars and rest on the ground surface.

6 Claims, 10 Drawing Sheets

U.S. PATENT DOCUMENTS

| | | | |
|---|---|---|---|
| 6,205,912 B1 * | 3/2001 | Chiu | 99/339 |
| 6,401,630 B1 * | 6/2002 | Peterson | 108/12 |
| 6,439,221 B1 * | 8/2002 | Ward et al. | 126/25 R |
| 6,863,063 B2 * | 3/2005 | Yeh | 126/25 R |
| 6,923,416 B1 * | 8/2005 | Hsieh | 248/431 |
| D511,913 S * | 11/2005 | Kearl et al. | D6/487 |
| 7,225,745 B2 * | 6/2007 | Schwerdlin et al. | 108/118 |
| 2004/0182381 A1 * | 9/2004 | Yeh | 126/25 R |
| 2006/0130825 A1 * | 6/2006 | Yeh | 126/25 R |
| 2007/0175369 A1 * | 8/2007 | Reiner | 108/118 |
| 2007/0221104 A1 * | 9/2007 | Tseng | 108/118 |
| 2007/0290486 A1 * | 12/2007 | Chung | 280/645 |

* cited by examiner

MOBILE BARBECUE GRILL

BACKGROUND OF THE INVENTION

1. Field of the Invention

The present invention relates to a barbecue grill and, particularly, to a mobile barbecue grill.

2. Description of the Prior Art

Figure 1:
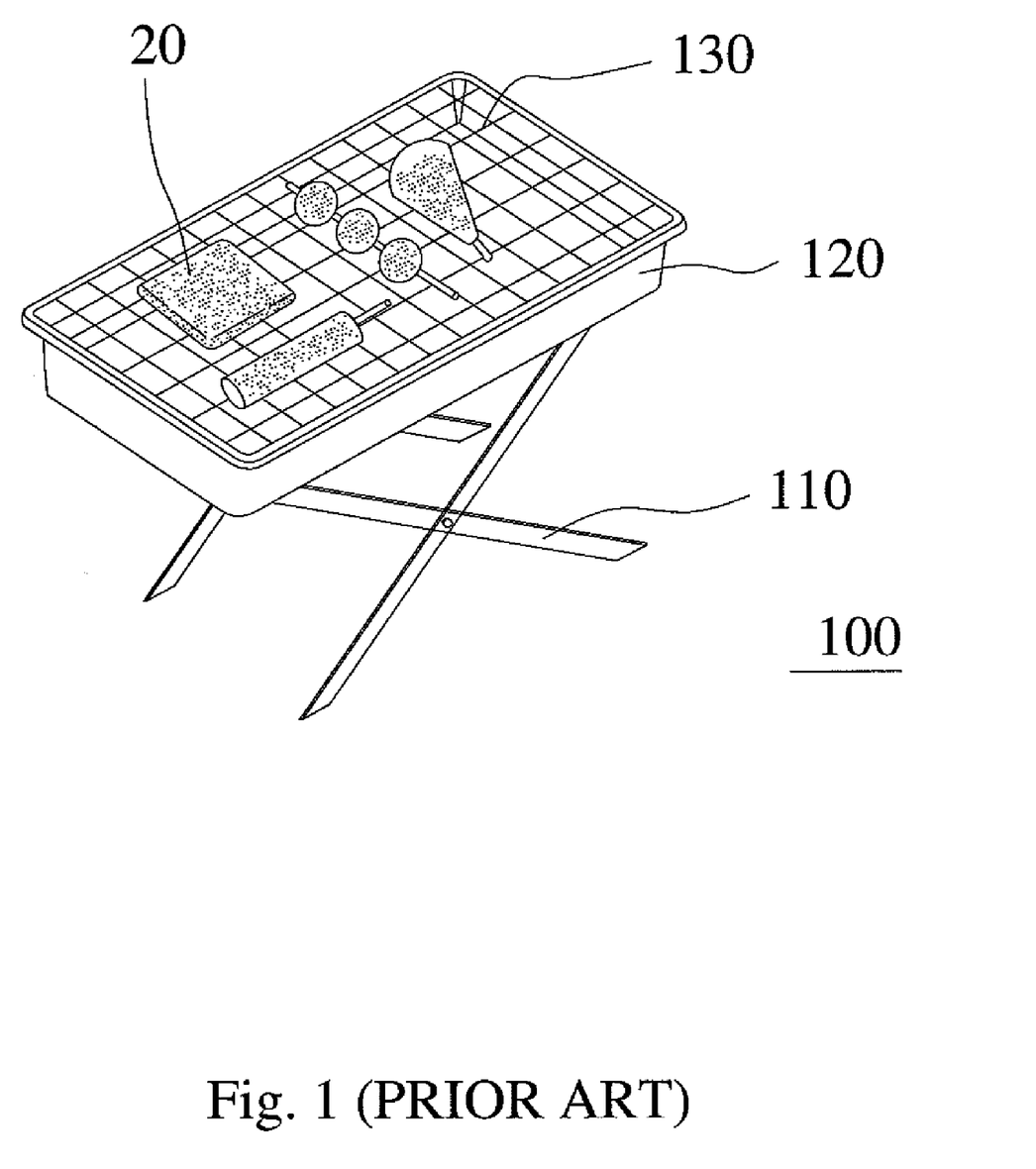
FIG. 1 is a schematic view of a conventional barbecue grill.

Barbecue is a popular leisure activity. Hence, barbecue grills and accessories are well-accepted products on the market. There are many types of barbecue grills and accessories available on the market. However, most of the barbecue grills have a common drawback, namely, they are difficult to pack and store. Refer to FIG. 1 for a conventional barbecue grill 100. It mainly includes a bracing rack 110, a stove casing 120 and a cooking grid 130. The stove casing 120 is supported by the bracing rack 110. The cooking grid 130 is held on the stove casing 120. The meat 20 to be roasted is held on the cooking grid 130. After the roasting is finished and the barbecue grill 100 is no longer in use, the stove casing 120 has to be disassembled, and the bracing rack 110, stove casing 120 and cooking grid 130 are removed separately. Such a packing and storing arrangement is troublesome.

How to make a barbecue grill easier to pack and store and more convenient to use is an issue that remains to be resolved.

SUMMARY OF THE INVENTION

The primary object of the present invention is to provide a mobile barbecue grill that can be packed and stored simpler and easier.

To achieve the aforesaid object, the mobile barbecue grill of the invention includes a base, a first handle, an upper lid, a holding member, a first bracing rack, a second bracing rack and a pair of wheels. The base aims to hold a cooking grid. The first handle is located on an outer side of the base. The upper lid aims to cover the base. The holding member has one end coupling with the bottom of the base. The first bracing rack is located beneath the base and has two first upright bars and a first transverse bar coupling the first upright bars. The first transverse bar is leaned against the holding member and supports the base. The first bracing rack has one end remote from the base and resting on the ground surface. The second bracing rack is located below the base and has two second upright bars and a second transverse bar coupling the second upright bars. The second transverse bar is pivotally coupled with the bottom of the base. The second upright bars and the first upright bars are pivotally coupled. The wheels are coupled with one end of the second upright bars and rest on the ground surface.

In one aspect, the upper lid has a second handle on an outer side thereof.

In another aspect, the first bracing rack has an upper half portion lighter than a lower half portion thereof. The upper half portion is above the pivotal coupling location of the first bracing rack and the second bracing rack. The lower half portion is below the pivotal coupling location of the first bracing rack and the second bracing rack.

In yet another aspect, the holding member is a U-shaped holding rack which has two ends inserted into the base.

In yet another aspect, the second transverse bar is pivotally coupled with the bottom of the base through a pivotal device. The pivotal device includes a first pivotal element, a second pivotal element and a second axle. The first pivotal element is located at the bottom of the base and has a first round hook formed at a front end. The second pivotal element is located on the second transverse bar and has a second round hook formed at a front end thereof. The second axle runs through the first and second round hooks.

The mobile barbecue grill thus formed is more convenient for packing and storing. By providing the wheels, it can be easily hauled to a desired location. Thus, it provides a significant improvement over conventional barbecue grills.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 2A:
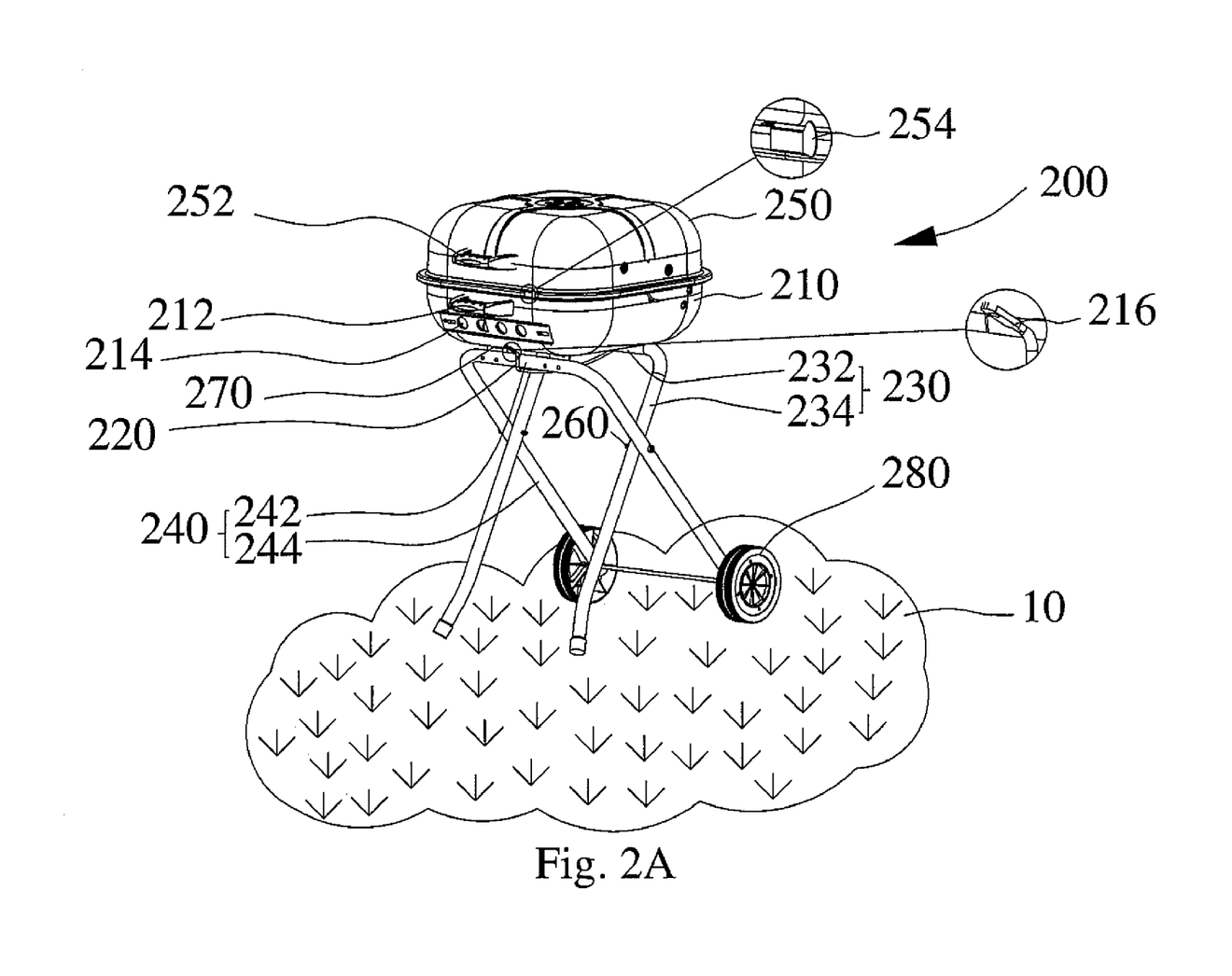
FIG. 2A is a schematic view of a first embodiment of the mobile barbecue grill of the invention.
Figure 5:
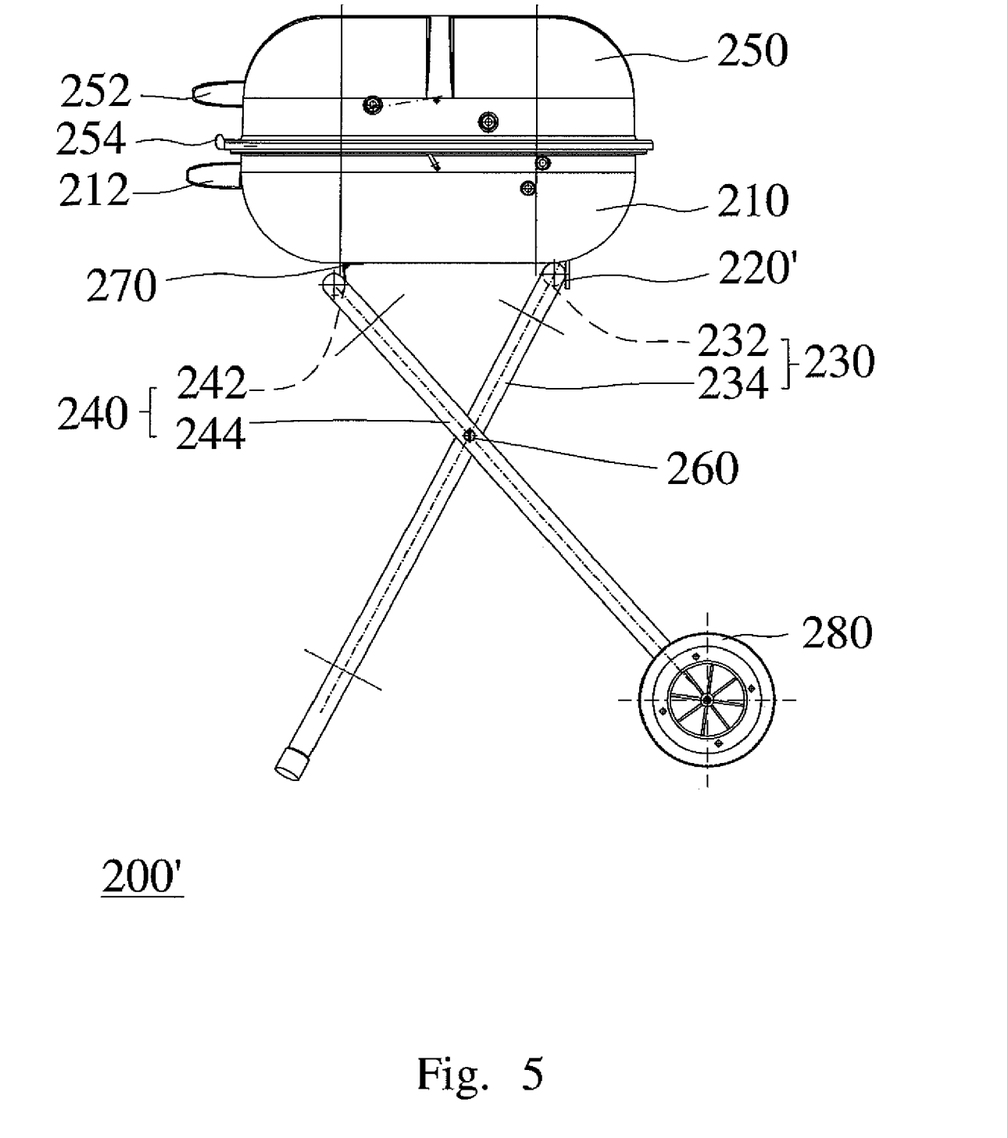
FIG. 5 is a schematic view of a second embodiment of the mobile barbecue grill of the invention.

Please refer to FIG. 2A for a first embodiment of the mobile barbecue grill 200 of the invention. It is rested on a ground surface 10 and includes a base 210, a U-shaped holding rack 220, a first bracing rack 230, a second bracing rack 240, an upper lid 250 and a pair of wheels 280. There is a cooking grid 130' mounted onto the base 210 (referring to FIG. 2B). The base 210 has a first handle 212 at an outer side, a plurality of air inlets 214 at a front side, and a latch means 216 which has apertures (not shown in the drawings) to be inserted by the U-shaped holding rack 220 so That the U-shaped holding rack 220 can be anchored on a lower side of the base 210. Of course, the U-shaped holding rack 220 may be substituted by other holding members. Also, refer to FIG. 5 for a second embodiment of the mobile barbecue grill 200' of the invention. The holding rack in this embodiment has an upright bar 220' at the bottom of the base 210 to be leaned against a first transverse bar 232 same as the U-shaped holding rack 220 shown in FIG. 2C. If the holding member were omitted, (such as the upright bar 220' and U-shaped holding rack 220), the first transverse bar 232 will slide outwards and result in toppling of the mobile barbecue grill 200 or 200'.

Referring to FIG. 2A, the first bracing rack 230 is located beneath the base 210 and includes two first upright bars 234 and the first transverse bar 232 that couples the first upright bars 234. The two first upright bars 234 are parallel with each other. The first transverse bar 232 bridges the two first upright bars 234. Moreover, the first transverse bar 232 is leaned against one side of the U-shaped holding rack 220 and supports the base 210 (referring to FIG. 2C). The first bracing rack 230 has one end remote from the base 210 and rested on the ground surface 10. The second bracing rack 240 is located beneath the base 210, and has two second upright bars 244 and a second transverse bar 242 coupling the second upright bars 244. The two second upright bars 244 are parallel with each other. The second transverse bar 242 bridges the two second upright bars 244. The mobile barbecue grill 200 further has two pieces of first axles 260 which run through the second upright bars 244 and the first upright bars 234 so that the second upright bars 244 and the first upright bars 234 are pivotally coupled with each other. In the first embodiment, the second transverse bar 242 is pivotally coupled with the bottom of the base 210 through two pivotal devices 270. The wheels 280 are coupled on one end of the second upright bars 244 and rest on the ground surface 10.

Figure 3A:
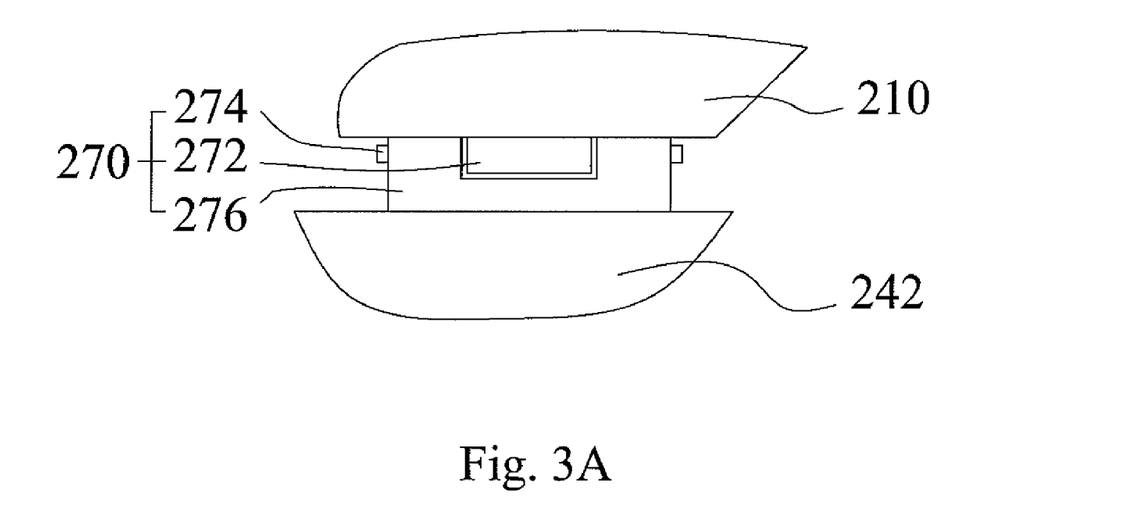
FIG. 3A is a front view of the pivotal device of the invention.
Figure 3B:
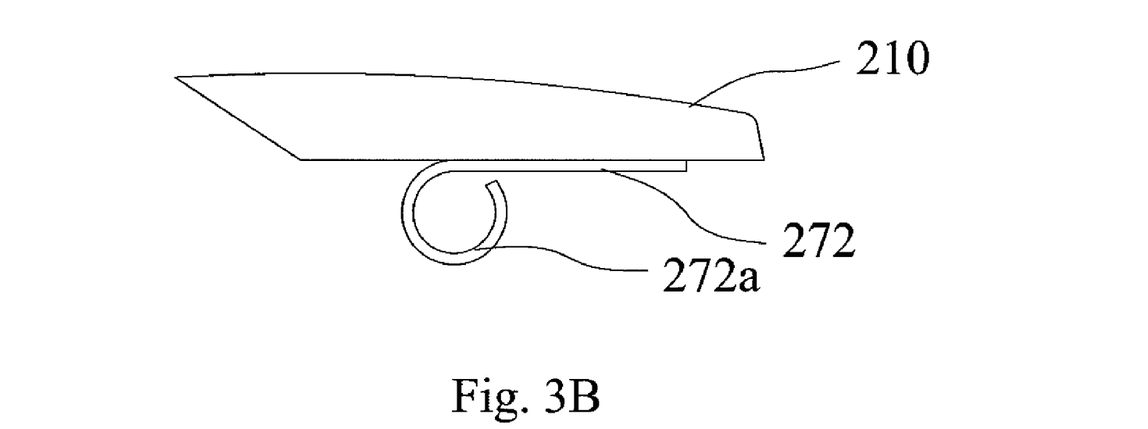
FIG. 3B is a side view of the first pivotal element of the pivotal device of the invention.
Figure 3C:
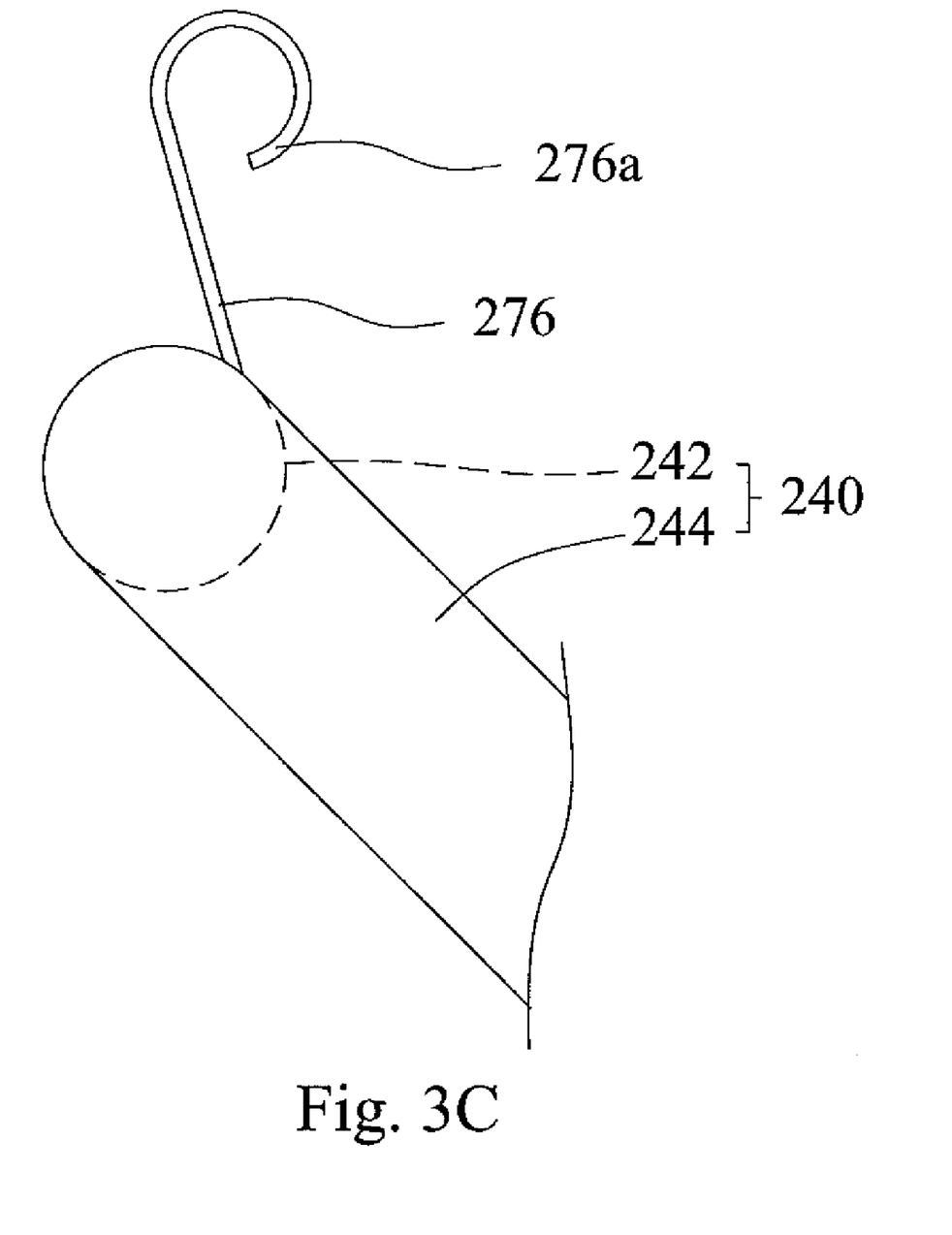
FIG. 3C is a side view of the second pivotal element of the pivotal device of the invention.

Referring to FIGS. 3A, 3B and 3C, the pivotal device 270 includes a first pivotal element 272, a second axle 274 and a second pivotal element 276. The first pivotal element 272 is located at the bottom of the base 210. The first pivotal element 272 has a front end forming a first round hook 272a. The second pivotal element 276 is located on the second transverse bar 242, and has a front end forming a second round hook 276a which is coaxial with the first round hook 272a. By running the second axle 274 through the space surrounded by the first and second round hooks 272a and 276a, the second bracing rack 240 can be pivotally coupled on the bottom of the base 210.

Referring to FIG. 2A, in this embodiment, the first bracing rack 230 has an upper half portion lighter than a lower half portion. The upper half portion of the first bracing rack 230 is above the pivotal location (namely where the first axle 260 running through) of the first bracing rack 230 and the second bracing rack 240. The lower half portion of the second bracing rack 240 is below the pivotal location of the first bracing rack 230 and the second bracing rack 240.

Figure 2B:
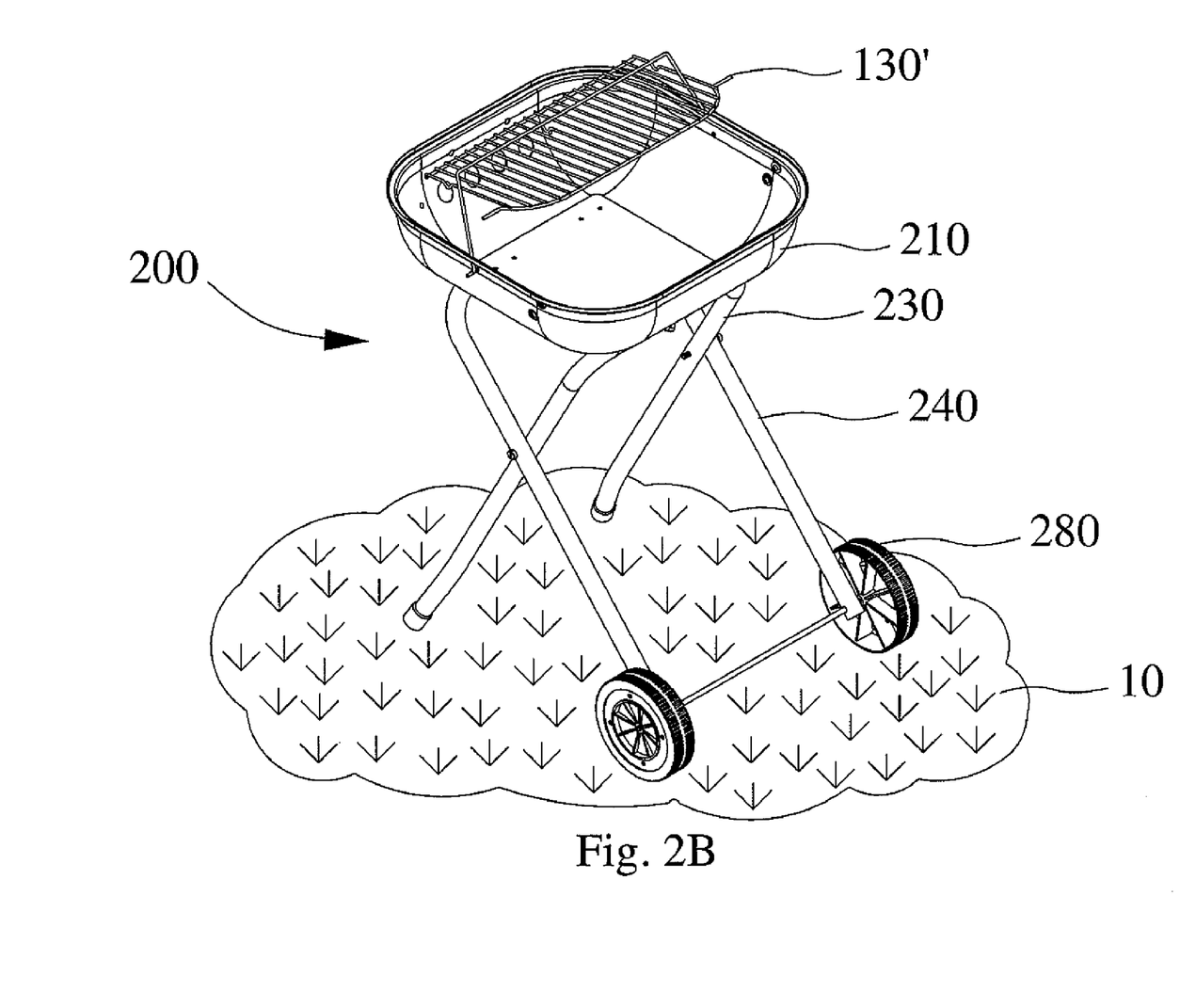
FIG. 2B is a schematic view of the mobile barbecue grill of the invention with the upper lid removed.
Figure 2C:
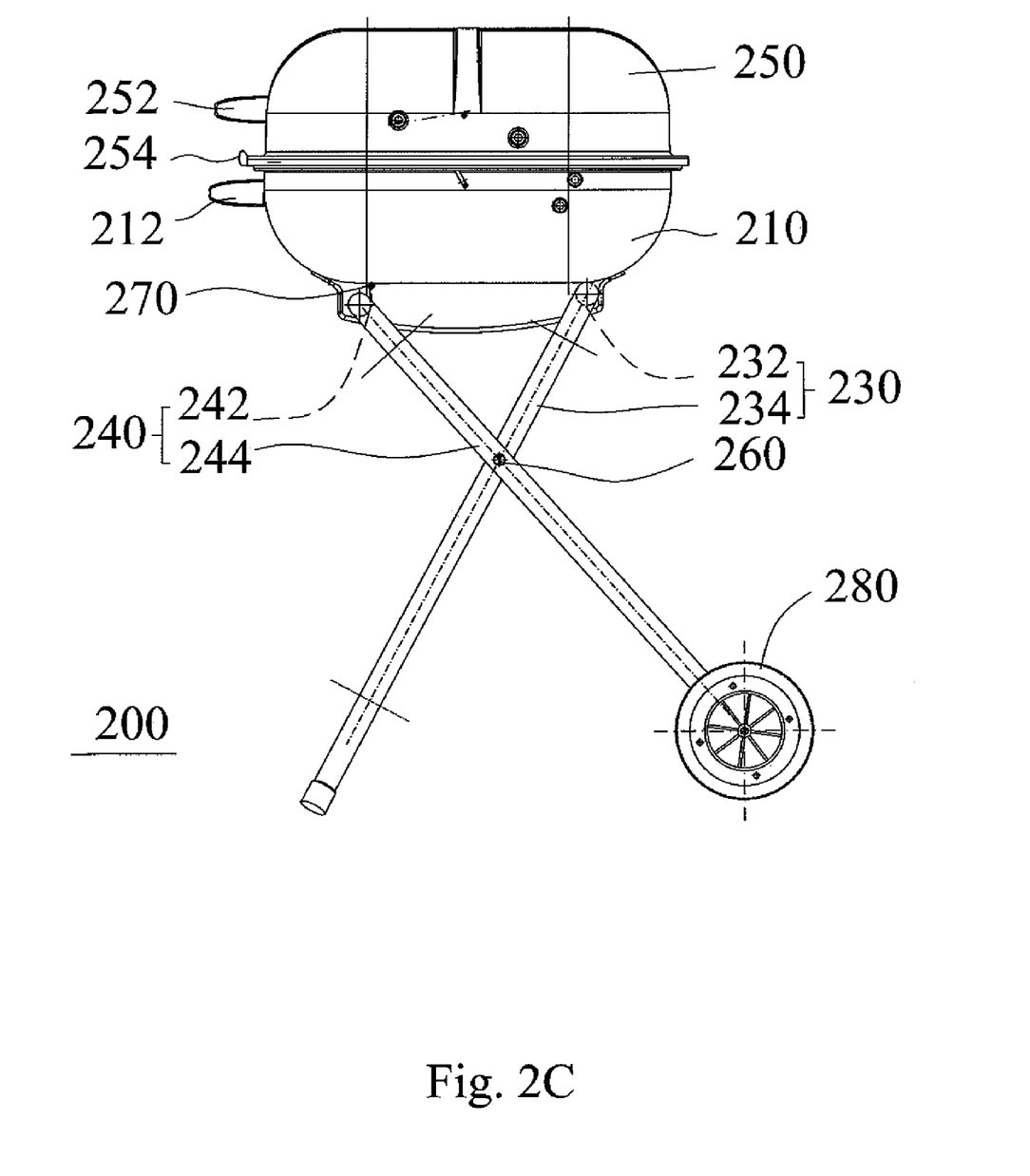
FIG. 2C is a side view of the mobile barbecue grill of the invention.

Referring to FIG. 2B, when the mobile barbecue grill 200 is in use, the upper lid 250 is opened to dispose meats (not shown in the drawings) resting on the cooking grid 130' for roasting. After finished using, the upper lid 250 can be covered over the base 210. A clipping means 254 is provided to clip the edges of the upper lid 250 and the base 210 so that they do not easily slide against each other. Of course, to those skilled in the art, other means may be adopted (such as fastening means) to anchor the upper lid 250 on the base 210. Moreover, the upper lid 250 has a second handle 252 to facilitate moving of the upper lid 250.

Figure 4A:
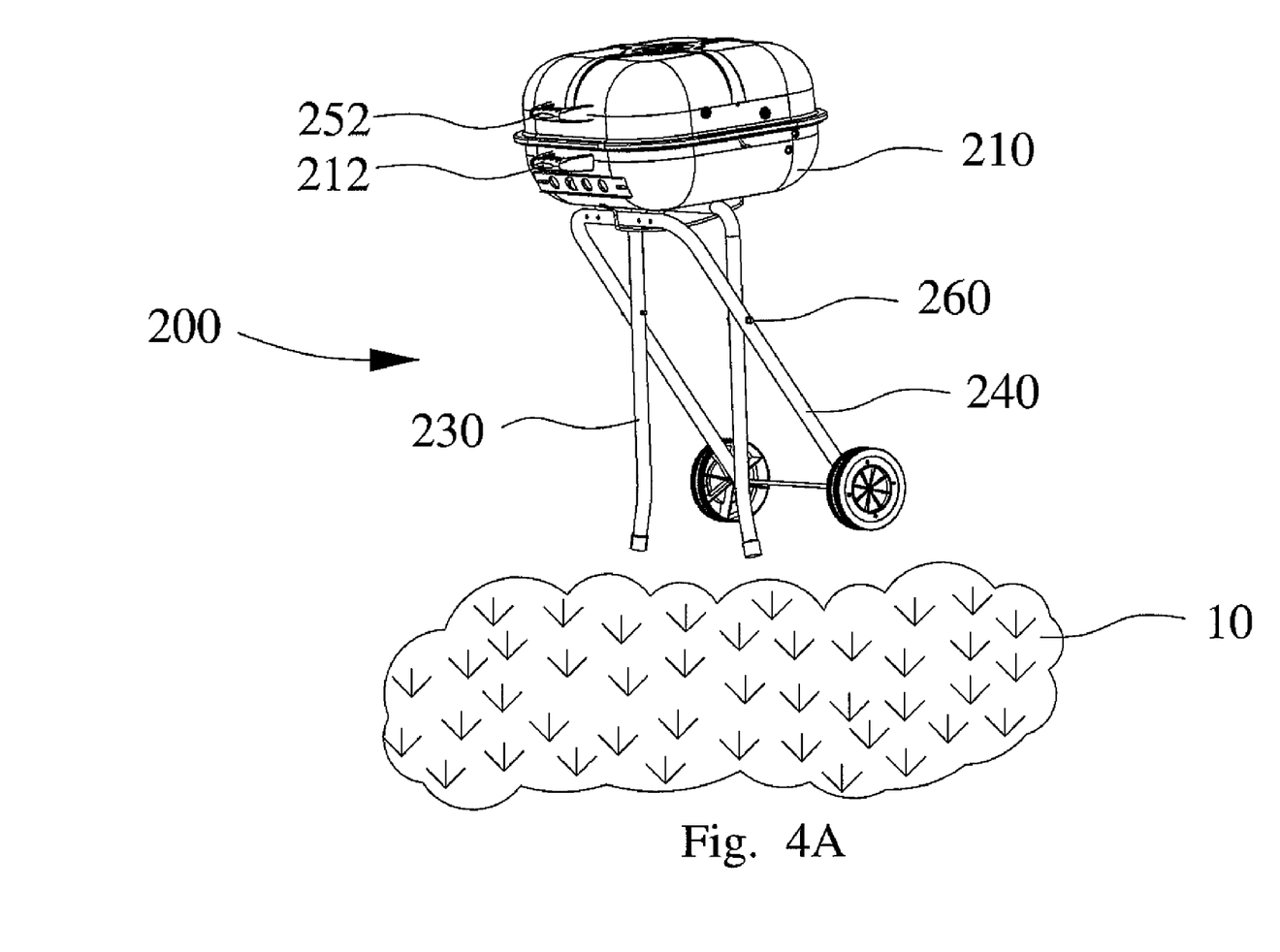
FIGS. 4A, 4B and 4C are schematic views of the mobile barbecue grill in packing processes.
Figure 4B:
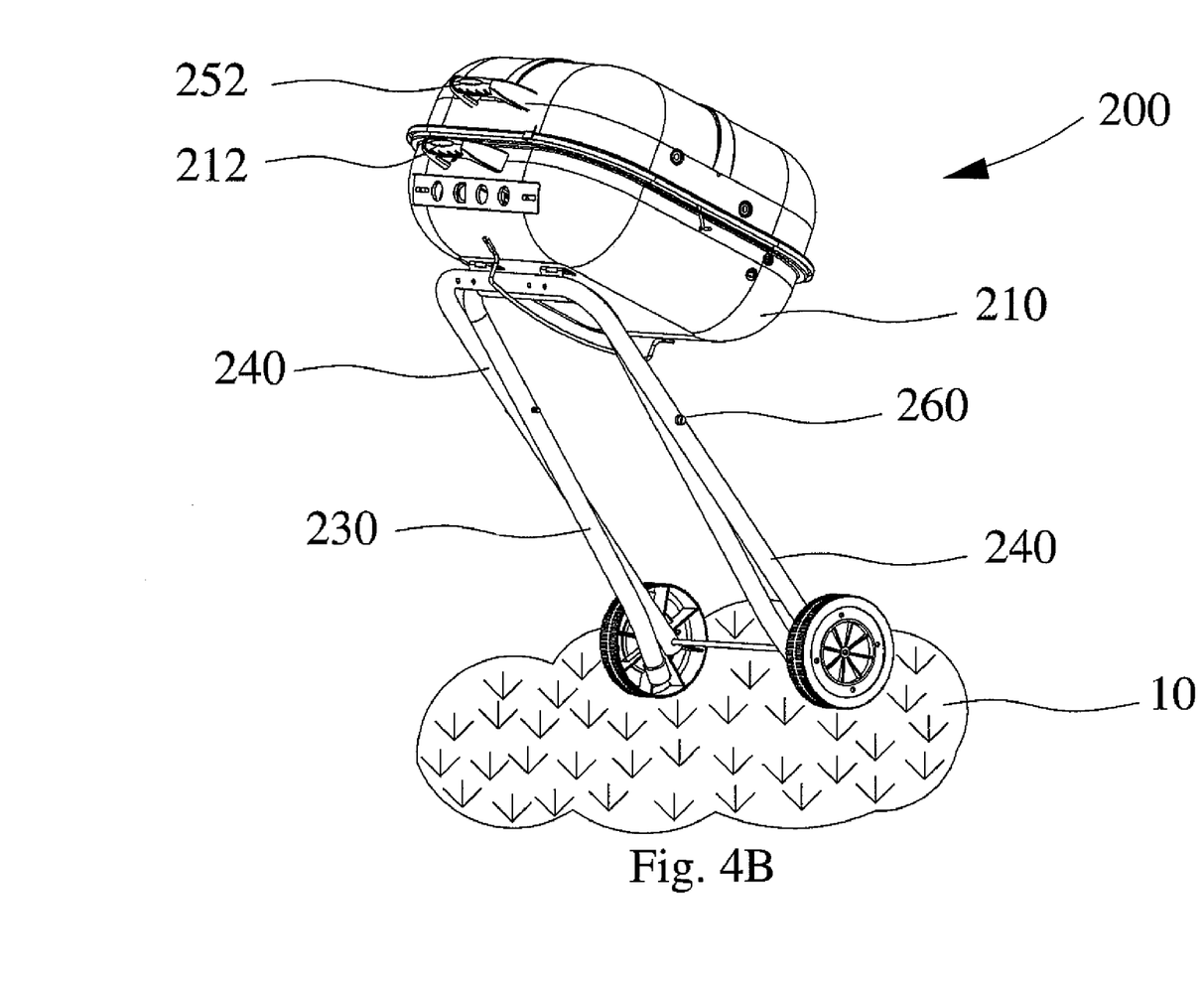
Figure 4C:
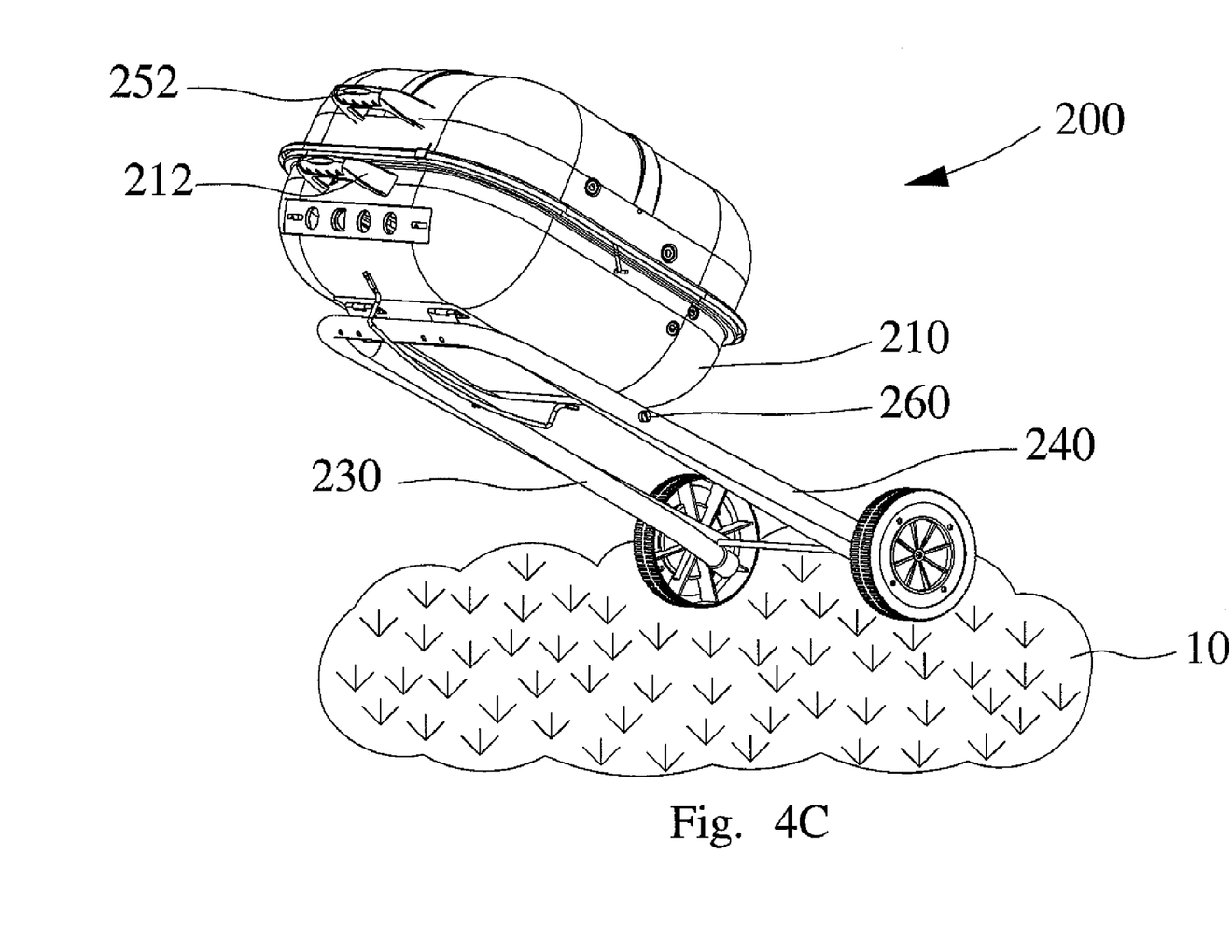

Referring to FIGS. 4A, 4B and 4C, for packing the mobile barbecue grill 200, first, referring to FIG. 4A, the base 210 is held at two ends and lifted to move the first bracing rack 230 and the second bracing rack 240 above the ground surface 10. Due to gravity force, the second bracing rack 240 can sway about the second axle 274 (referring to FIG. 3A) clockwise to separate the first transverse bar 232 from the base 210. As the upper half portion of the first bracing rack 230 is lighter than the lower half portion, the first bracing rack 230 can sway counterclockwise about the first axle 260. Referring to FIG. 4B, the base 210 is pushed downwards, and the first and second bracing racks 230 and 240 can be folded and stacked together. Referring to FIG. 4C, then, users can grasp the first handle 212 or the second handle 252 to haul the mobile barbecue grill 200 to a desired location.

In the first embodiment, the base 210 and the upper lid 250 have respectively the first handle 212 and the second handle 252. The upper lid 250 prevents contamination in the base 210.

In short, to pack and store the mobile barbecue grill, users need only to lift the base first and then to push the base downwards. With the wheels installed thereon, the mobile barbecue grill can be easily hauled to a desired location. Thus, the mobile barbecue grill of the invention is more convenient to use than conventional barbecue grills.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A mobile barbecue grill to be rested on a ground surface, comprising:
    a base to hold a cooking grid;
    a first handle located on an outer side of the base;
    an upper lid to cover the base;
    a holding member coupling with the bottom of the base, wherein the holding member is a U-shaped holding rack having first and second ends inserted into the base, wherein the U-shaped holding rack further has an interconnection member, with the first and second ends of the U-shaped holding rack extending from the interconnection member to define a U-shape, the interconnection member being arcuate between the first and second ends of the U-shaped holding rack, the minimum distance of the interconnection member from the bottom of the base is greater than the diameter of the first transverse bar to allow the first bracing rack to freely pivot under the force of gravity, and the maximum distance of the interconnection member from the bottom of the base is spaced from and intermediate the first and second ends of the interconnection member;
    a first bracing rack which is located beneath the base and has two first upright bars and a first transverse bar coupling the two first upright bars at first and second couplings, with the first bracing rack having one end which is remote from the base and rests on the ground surface, with the first transverse bar hem intermediate the base and the interconnection member;
    a second bracing rack which is located beneath the base and has two second upright bars and a second transverse bar coupling the two second upright bars, the second transverse bar being pivotally coupled with the bottom of the base, the second upright bars being pivotally coupled with the first upright bars at a pivotal location; and
    a pair of wheels coupling with one end of the second upright bars and resting on the ground surface, with the first and second bracing racks being moveable between a supporting position and a packed position, with the two first and second upright bars of the first and second bracing racks being at a non-parallel angle and the first transverse bar being leaned against the holding member in the supporting position, with the two first and second upright bars of the first and second bracing members being parallel in the packed position, with the first transverse bar located intermediate the base and the interconnection member and the first transverse bar capable of abutting with the base while moving between the supporting and packed positions, with the first end of the U-shaped holding rack located adjacent to the second transverse bar and with the second end located adjacent to the first transverse bar in the supporting position, with the first transverse bar extending through the U-shaped holding rack with the first and second couplings being spaced from the interconnection member.

2. The mobile barbecue grill of claim 1 further having a second handle located on an outer side of the upper lid.

3. The mobile barbecue grill of claim 1, wherein the first bracing rack has an upper half portion lighter than a lower half portion thereof, the upper half portion being above the pivotal location of the first and second bracing racks, the lower half portion being below the pivotal location of the first and second bracing racks.

4. The mobile barbecue grill of claim 1 further having two first axles running through the two second upright bars and the two first upright bars so that the two second upright bars and the two first upright bars are pivotally coupled together at a pivotal location.

5. The mobile barbecue grill of claim 1, wherein the second transverse bar is pivotally coupled with the bottom of the base through a pivotal device which includes:

a first pivotal element which is located at the bottom of the base and has a front end forming a first round hook;
a second pivotal element which is located on the second transverse bar and has a front end forming a second round hook; and
a second axle running through the first round hook and the second round hook.

6. The mobile barbecue grill of claim 1, wherein the U-shaped holding rack is equidistant between the two first upright bars.

* * * * *